J. M. THOMPSON.
STREET FLUSHING APPARATUS.
APPLICATION FILED MAR. 31, 1916.
1,282,142.
Patented Oct. 22, 1918.
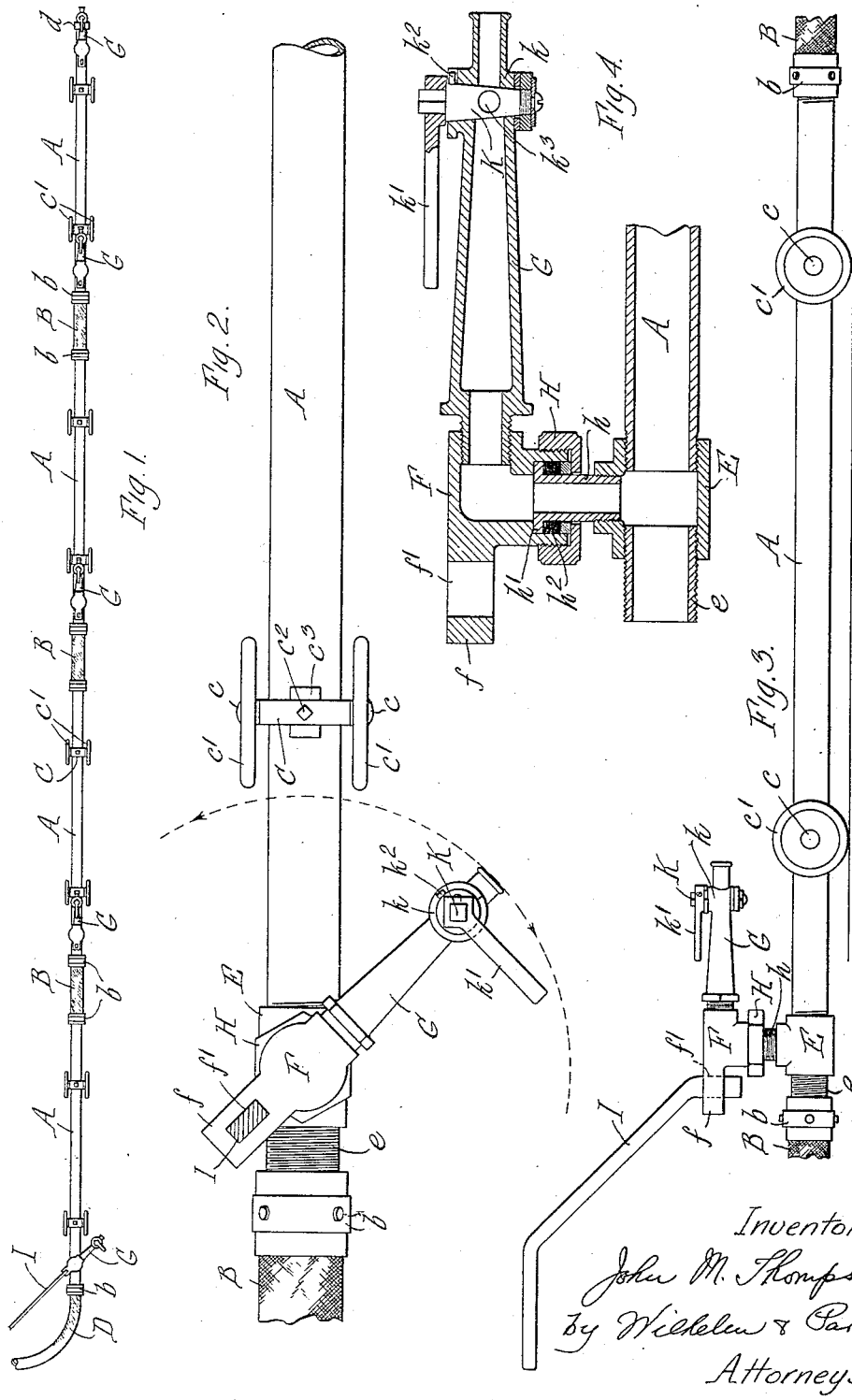

UNITED STATES PATENT OFFICE.

JOHN M. THOMPSON, OF BUFFALO, NEW YORK.

STREET-FLUSHING APPARATUS.

1,282,142. Specification of Letters Patent. Patented Oct. 22, 1918.

Application filed March 31, 1916. Serial No. 88,030.

*To all whom it may concern:*

Be it known that I, JOHN M. THOMPSON, a citizen of the United States, residing at Buffalo, in the county of Erie and State of New York, have invented a new and useful Improvement in Street-Flushing Apparatus, of which the following is a specification.

This invention relates to apparatus for flushing and cleaning streets by means of a stream or jet of water.

One object of the invention is to provide an apparatus of this kind which can be readily moved along the street from one hydrant to another and in which the parts are so arranged as to facilitate the operation of the apparatus and to reduce the cost of cleaning streets by flushing. This is accomplished by providing a pipe line which is made up of a plurality of sections movably connected with each other and mounted on wheels or casters to enable the pipe line to be readily moved along a street, and which is adapted to be connected with a hydrant and is provided at intervals with swiveled discharge nozzles arranged in proper operative relation to the street. These nozzles can be successively employed to flush a street without necessitating the attachment or detachment of the nozzles from the pipe line, thereby greatly reducing the time required to flush streets.

The invention also has the object of improving the construction of devices of this kind in other respects hereinafter specified.

In the accompanying drawings:

Figure 1 is a top plan of a street flushing apparatus embodying the invention.

Fig. 2 is a fragmentary plan view thereof, on an enlarged scale, showing one end of one of the pipe sections.

Fig. 3 is a fragmentary elevation thereof showing one of the pipe sections.

Fig. 4 is a fragmentary sectional elevation thereof showing a nozzle and its connection with a pipe section.

A represents the sections of the pipe line which are made of lengths of pipe threaded at their opposite ends to enable several sections to be connected by suitable flexible connections B, which may, as is the case in the construction shown, consist of short lengths of hose provided at opposite ends with hose couplings $b$ of any suitable or desired kind that can be connected with the pipe sections.

The pipe sections are suitably mounted on wheels, casters, trucks, or the like, to enable them to be moved along a street. In the construction shown for this purpose, trucks are provided comprising body portions or members C which are rigidly secured to the pipe sections and which are provided at opposite sides with axles or bearings $c$ on which wheels $c'$ are journaled. The body portions of the trucks shown are ring-shaped and extend circumferentially around the pipe sections, and a set screw $c^2$ is secured in the body portion of each truck and is adapted to bear against the pipe section to prevent the turning of the same relatively to the truck. In order to prevent the set screws from injuring the pipe sections, wear plates $c^3$ are preferably interposed between the set screws and the pipe section. Trucks or wheels of any other suitable kind may be provided which are so secured on the pipe sections as to prevent the turning of the sections relatively to the trucks or the wheels.

One end of the pipe line is closed by any suitable means, such as a screw cap $d$ and the other end is provided with a flexible tube or hose D adapted to be connected with a hydrant or other source of water supply (not shown) for supplying water to the pipe line. The cap $d$ and the flexible hose D are interchangeable so that water may be supplied to the pipe line at either end thereof.

Pivoted or swiveled nozzles, through which the water from the pipe line is discharged to the street, are provided at intervals along the pipe line, the intervals being such that a stream of water can be projected from one nozzle somewhat beyond the next nozzle, so that the areas flushed by the different nozzles overlap to a certain extent to insure the thorough cleaning of the street. The nozzles may be mounted on the pipe line in any suitable manner, and pivotal connections of any desired construction are provided for pivotally mounting the nozzles on the pipe line so that they are ready for use at all times. In the construction shown, T-couplings or other fittings E are provided which are arranged between the pipe sections and the flexible connections and which may be secured on one or both ends of the pipe sections, threaded nipples $e$ being interposed between the T-couplings and the flexible connections. G represents the nozzles, which may be formed integral with or secured to an elbow or other suitable fitting F, which is pivotally mounted on the T-coupling E. Each swivel or pivoted connection, in the construction shown, comprises a short tube $h$ secured on the T-coupling and having its upper end provided with a flange $h'$ arranged in an annular depression or cavity in the elbow F of the swivel member and is held in place by means of a nut H having a threaded engagement with the elbow F. Suitable packing $h^2$ is arranged in the cavity in the elbow F between the nut and the flange $h'$.

The elbow F is provided with an arm or extension $f$ having a hole or socket $f'$ adapted to receive a handle I by means of which the nozzle G may be turned to direct the stream from the nozzle in any desired direction. This handle is preferably so made that it can be easily inserted into the socket $f'$ or removed therefrom so as not to interfere with the free moving of the pipe line along the street. Other means may be provided if desired for directing the nozzles.

Means are provided in connection with each of the nozzles for turning on and shutting off the flow of water through the nozzle. In the construction shown, a valve or cock K is provided which is arranged in an enlarged portion or valve housing $k$ of the nozzle. Each valve is provided with a handle $k'$ for turning the same, and a stop $k^2$ is employed to limit the opening and closing movement of the valve. The valve K has a transverse hole $k^3$ which is adapted to be moved into or out of registration with the passage through the nozzle for turning on or shutting off the flow of water.

The apparatus described has the advantage that it can be very quickly attached to the hydrant and when attached is immediately ready for operation. In order to flush a street the handle I is placed in the socket $f'$ of one of the nozzles, the flushing being preferably commenced at one of the ends of the pipe line, and the valve of the nozzle is opened. When the area controlled by a stream of water from the first nozzle has been flushed the valve K therein is turned off and the operator proceeds to the next nozzle, and so on throughout the length of the pipe line. In order to take advantage of the full length of the pipe line, a nozzle is preferably provided at each extreme end thereof. In order to accomplish this, each of the pipe sections in the construction shown, except the end section, is provided with one nozzle and the end section is provided with a nozzle at each end, the nozzles being so arranged that they are at substantially equal distances from each other and so that there is a nozzle at each end of the pipe line.

I claim as my invention:

1. In a street flushing apparatus, the combination of a pipe line adapted to be connected with a source of water supply and comprising a plurality of rigid pipe sections, trucks on which said sections are mounted, said trucks comprising a body portion rigidly secured to the pipe sections, and wheels journaled on said body portion, discharge nozzles mounted on said pipe line in close proximity to the street pavement to direct a current of water in a direction substantially parallel with the street and in close proximity thereto and swiveled to turn relatively to the pipe line, said discharge nozzles being spaced at such intervals that a stream projected from one nozzle will reach beyond the next nozzle, means on said nozzles for controlling the flow of water from the same, and a handle adapted to be removably secured to any of said nozzles for directing the nozzle and the stream discharged therefrom.

2. In a street flushing apparatus, the combination of a pipe line adapted to be connected with a source of water supply and comprising a plurality of rigid pipe sections supported in close proximity to the street pavement, connections between said pipe sections permitting said sections to swing with regard to each other, a plurality of discharge nozzles mounted on said pipe line and swiveled to turn in planes substantially parallel to the street, said discharge nozzle being spaced at such intervals that a stream projected from one nozzle will reach beyond the next nozzle, and a valve for each nozzle for controlling the flow of water from the same, said nozzles being adapted to be swung at will about their swiveled connection to effect the flushing of a street.

3. In a street flushing apparatus, the combination of a pipe line adapted to be connected with a source of water supply and comprising a plurality of rigid pipe sections movably connected with each other, wheels on which said sections are mounted and which support said pipe line in close proximity to the ground, a plurality of discharge nozzles mounted on said pipe line and swiveled to turn relatively to the pipe line and adapted to project a jet of water in close proximity to the street pavement and substantially parallel thereto, said discharge nozzles being spaced at such intervals that a stream projected from one nozzle will reach beyond the next nozzle, a valve for each nozzle for controlling the flow of water therefrom, and means operable at will to swing said nozzles about their swiveled connections with said pipe line for directing the stream of water from the nozzle.

4. In a street flushing apparatus, the combination of a pipe line adapted to be connected with a source of water supply and comprising a plurality of rigid pipe sections movably connected with each other, trucks rigidly connected with said pipe line, a plurality of discharge nozzles arranged on the upper side of said pipe line in close proximity to the street and having a swiveled connection with the pipe line to permit said nozzles to swing in planes substantially parallel to the plane of the street, said discharge nozzles being spaced at such intervals that a stream projected from one nozzle will reach beyond the next nozzle, and a valve for each nozzle for controlling the discharge of water therefrom.

5. In a street flushing apparatus, the combination of a pipe line comprising a plurality of rigid pipe sections movably connected with each other and mounted on trucks and movable along a street, a flexible hose for connecting said pipe line with a source of water supply, a plurality of discharge nozzles pivotally mounted on said pipe line and adapted to swing in planes substantially parallel with the plane of a street, said discharge nozzles being spaced at such intervals that a stream projected from one nozzle will reach beyond the next nozzle, and a valve for each of said nozzles for controlling the discharge of water therefrom.

6. In a street flushing apparatus, the combination of a pipe line adapted to be connected with a source of water supply and comprising a plurality of rigid pipe sections movably connected with each other and mounted on trucks to adapt the pipe line to be moved along a street in close proximity to the pavement thereof, a plurality of discharge nozzles pivotally mounted on said pipe line and adapted to swing in planes substantially parallel with the plane of a street, said discharge nozzles being spaced at such intervals that a stream projected from one nozzle will reach beyond the next nozzle, and means operable at will for controlling the discharge of water from each of said nozzles.

7. In a street flushing apparatus, the combination of a pipe line adapted to be connected with a source of water supply and comprising a plurality of rigid pipe sections, trucks on which said sections are mounted, said trucks comprising ring shaped body portions arranged about the pipe sections, means for releasably securing said body portions to said pipe sections, and wheels journaled on said body portions, a plurality of discharge nozzles mounted at intervals on said pipe line and swiveled to turn in planes substantially parallel to the street, and a valve for each nozzle for controlling the flow of water from the same, said nozzles being adapted to be swung at will about their swiveled connection to effect the flushing of a street.

Witness my hand, this 30th day of March, 1916.

JOHN M. THOMPSON.

Witnesses:
F. E. PROCHNOW,
A. L. McGEE.

Copies of this patent may be obtained for five cents each, by addressing the "Commissioner of Patents, Washington, D. C."